(12) United States Patent
Shahar et al.

(10) Patent No.: US 9,754,508 B2
(45) Date of Patent: Sep. 5, 2017

(54) COMPUTERIZED METHOD AND SYSTEM FOR ANALYZING AND PROCESSING A FOOD RECIPE

(71) Applicants: Ofir Shahar, Ramat Hasharon (IL); Dror Daliot, Givatayim (IL); Tal Rosenberg, Tel Aviv (IL)

(72) Inventors: Ofir Shahar, Ramat Hasharon (IL); Dror Daliot, Givatayim (IL); Tal Rosenberg, Tel Aviv (IL)

(73) Assignee: NUTRISHER LTD., Bnei Brak (IL)

( * ) Notice: Subject to any disclaimer, the term of this patent is extended or adjusted under 35 U.S.C. 154(b) by 295 days.

(21) Appl. No.: 14/537,915

(22) Filed: Nov. 11, 2014

(65) Prior Publication Data

US 2015/0170543 A1    Jun. 18, 2015

Related U.S. Application Data

(60) Provisional application No. 61/904,000, filed on Nov. 14, 2013.

(51) Int. Cl.
*G06F 17/30* (2006.01)
*G09B 19/00* (2006.01)
*G09B 5/02* (2006.01)

(52) U.S. Cl.
CPC .......... *G09B 19/0092* (2013.01); *G09B 5/02* (2013.01)

(58) Field of Classification Search
None
See application file for complete search history.

(56) References Cited

U.S. PATENT DOCUMENTS

| | | | | |
|---|---|---|---|---|
| 6,236,974 | B1* | 5/2001 | Kolawa | G06Q 30/02 705/7.32 |
| 8,145,854 | B1* | 3/2012 | Lee | A23L 5/00 711/154 |
| 8,412,579 | B2* | 4/2013 | Gonzalez | G06Q 30/06 705/15 |
| 9,275,393 | B2* | 3/2016 | Argue | G06Q 30/02 |
| 9,286,589 | B2* | 3/2016 | Wiggins | H04L 67/306 |
| 9,495,360 | B2* | 11/2016 | Bhatt | G06F 17/28 |
| 2010/0153209 | A1* | 6/2010 | de Rubertis | G06F 17/30056 705/14.51 |
| 2012/0136864 | A1* | 5/2012 | Ochtel | G06Q 30/0633 707/738 |
| 2012/0322032 | A1* | 12/2012 | Smith | G09B 19/0092 434/127 |
| 2013/0183642 | A1* | 7/2013 | Wan | G09B 19/00 434/127 |
| 2015/0170543 | A1* | 6/2015 | Shahar | G09B 5/02 434/127 |
| 2015/0294593 | A1* | 10/2015 | Schoen | G09B 19/0092 434/127 |

* cited by examiner

*Primary Examiner* — Sunit Pandya (57) ABSTRACT

The invention provides a computerized method and system for processing a food recipe. After a user utilizes an electronic device to indicate a recipe of interest, the invention identifies ingredients in the recipe, and provides a user with displayable information related to the ingredients. One or more functions are provided for a user to select from: altering the number of food servings for the recipe; toggling between metric and US measurements listed in the recipe; receiving a displayed dietary label for the food produced by said recipe.

17 Claims, 11 Drawing Sheets

FIG. 1A

Banana Cake with Frosting 1 1/2 cups bananas, mashed, ripe
2 teaspoons lemon juice
3 cups flour
1 1/2 teaspoons baking soda
1/4 teaspoon salt
3/4 cup butter, softened
2 1/8 cups sugar
3 large eggs
2 teaspoons vanilla
1 1/2 cups buttermilk Frosting Ingredients 1/2 cup butter, softened
1 (8 ounce) packages cream cheese, softened
1 teaspoon vanilla
3 1/2 cups icing sugar
Garnish-chopped walnuts 1. Preheat oven to 275°.
2. Grease and flour a 9 x 13 pan.
3. In a small bowl, mix mashed banana with the lemon juice; set aside.
4. In a medium bowl, mix flour, baking soda and salt; set aside.
5. In a large bowl, cream 3/4 cup butter and 2 1/8 cups sugar until light and fluffy.
6. Beat in eggs, one at a time, then stir in 2 tsp vanilla.
7. Beat in the flour mixture alternately with the buttermilk.
8. Stir in banana mixture.
9. Pour batter into prepared pan and bake in preheated oven for one hour or until toothpick inserted in center comes out clean.
10. Remove from oven and place directly into the freezer for 45 minutes. This will make the cake very moist.
11. For the frosting, cream the butter and cream cheese until smooth.
12. Beat in 1 teaspoon vanilla.
13. Add icing sugar and beat on low speed until combined, then on high speed until frosting is smooth.
14. Spread on cooled cake. Sprinkle chopped walnuts over top of the frosting, if desired.

Nutrition Facts- Banana Cake with Frosting

Calories 503.4

Calories from Fat 185 36%

Serving Size: 1 (164 g)

Servings Per Recipe: 16

Amount Per Serving % Daily Value

Total Fat 20.6g 31%

Saturated Fat 12.3g 61%

Cholesterol 89.5mg 29%

Sugars 55.6 g

Sodium 365.4mg 15%

Total Carbohydrate 75.7g 25%

Dietary Fiber 1.0g 4%

Sugars 55.6 g 222%

Protein 5.5g 11%

Ingredients    9 Servings ⇕    Metric ⇕

- 3 tablespoons ghee (clarified butter)
- 1 1/2 onion, finely chopped
- 6 cloves garlic, minced
- 1 1/2 tablespoon ground cumin
- 1 1/2 teaspoon salt
- 1 1/2 teaspoon ground ginger
- 1 1/2 teaspoon cayenne pepper
- 3/4 teaspoon ground cinnamon         42
- 1/3 teaspoon ground turmeric
- 1 1/2 (397 gr) can tomato sauce
- 1 1/2 cup heavy whipping cream
- 3 teaspoons paprika
- 1 1/2 tablespoon white sugar
- 1 1/2 tablespoon vegetable oil

COMPUTERIZED METHOD AND SYSTEM FOR ANALYZING AND PROCESSING A FOOD RECIPE

FIELD OF THE INVENTION

The present invention relates to software and related hardware for aiding a professional cook or a homemaker, in analyzing and processing cooking recipes.

BACKGROUND

Recipes for cooking or baking are among the most popular types of digital content available online. This type of content directly affects a user's lifestyle, well-being, health, budget, and many more aspects of their daily lives. Consumers use recipes to make informed decisions about their lives, what they eat and purchase.

Recipes are usually written in a very concise, succinct manner. They do, however, contain implied information (also referred as "nutritional and dietary information"), which may be used by the consumer to make informed decisions about the cooking process of the recipe.

Nutritional and dietary information of a recipe may refer to: the nutritional data for the final dish cooked according to the recipe (e.g. caloric value), various diets it complies with, how well it goes with other dishes, whether it has substitute dishes that would better fit the consumer's needs, whether it contains ingredients which are harmful to consumers with specific allergies, whether it is allowed for those with a certain medical condition (e.g. diabetes), or whether it fits a certain dietary ideology (e.g. Kosher, vegan etc.).

A plethora of recipes are available to consumers. Some websites provide consumers with nutritional information. However a user cannot receive nutritional information or processing for any of the user's own recipes that are not already in the website's database.

Further, the nutritional information provided by websites is typically displayed in the format found on food nutrition labels, and is not readily understood by most consumers. The user has to spend time and effort to calculate and understand nutritional information, taking into account the list of ingredients contained in a given recipe and their corresponding quantities. A common example is estimating the caloric value of a recipe. The average consumer would not know how many calories a recipe contains, especially if he wants to change the quantities to cook for a different number of people than suggested. He would spend a substantial amount of time in order to calculate this information.

Some existing websites provide electronic calculators that allow the consumer to calculate the caloric or nutritional data for variety of ingredients. However, these calculators focus on the ingredients and do not take into account the cooking methods, i.e. the caloric value of fried onion will be different than non-fired onion.

Lastly, recipes usually need to be modified by the consumer so that the recipe would fit his needs. These modifications could be changing the number of servings (the recipe's yield), switching an ingredient with another ingredient due to its availability or personal preference, converting the recipe from the US measuring system to the metric system and vice versa, creating a grocery list from the recipe, and so on.

In view of the above, consumers interested in the nutritional information related to a given recipe need to be equipped with an easy to use software tool to process and analyze a recipe and obtain complete nutritional and dietary information thereof, and to perform variety of modifications on a recipe according to their preferences. Therefore, there is a need in the art for a system and method for allowing household and professional cooks, to perform the aforementioned tasks. The present invention relates to an automated analysis of a recipe, given in a natural language for computing nutritional and dietary information, such as caloric value, shopping list and other related information (called herein a "Recipe Analyzer").

These and other features and advantages of the present invention will be explained and will become apparent through the description of the invention and the accompanying drawings that follow.

SUMMARY OF THE INVENTION

The invention provide a computerized method for processing a food recipe, comprising:
  receiving a user indication of a food recipe of interest, in digital format;
  identifying ingredients listed in said food recipe;
  retrieving data on said identified ingredients from a database of ingredients and information related to said ingredients;
  visually indicating upon a display, the availability of said retrieved information related to said ingredient, wherein user selection causes display of said information;
  providing to the user one or more of the following:
    functionality to alter the measurements of ingredients according to the number of servings the user indicates;
    functionality to toggle between metric and US measurements indicated for the ingredients;
  displaying upon a user display, at least one graphic object indicating a dietary label for the food which the recipe produces, wherein selection of the graphic object causes display of an explanation of said dietary label.

The invention additionally provides a system for processing of a food recipe, comprising:
  a processor interacting with associated peripherals, said processor including a memory device and a driver; display means; said processor being in communication with said memory device, and being configured to:
    a) receive a user indication of a food recipe of interest, in digital format;
    b) identify ingredients listed in said food recipe;
    c) retrieve data on said identified ingredients from a database of ingredients and information related to said ingredients;
    d) provide a user with a visual indication upon a user display, the availability of said retrieved information related to said ingredient, wherein user selection causes display of said information;
    e) provide the user one or more of the following:
      functionality to alter the measurements of ingredients according to the number of servings the user indicates;
      functionality to toggle between metric and US measurements indicated for the ingredients;
      display upon a user display at least one graphic object indicating a dietary label for the food which the recipe produces, wherein selection of said graphic object causes display of an explanation of said dietary label.

provide a user with said resultant food recipe of steps a)-e), as a final processed food recipe displayable upon a user display.

BRIEF DESCRIPTION OF THE FIGURES

For a better understanding of the invention, with regard to the embodiments described, reference is made to the accompanying drawings, in which.

DETAILED DESCRIPTION OF THE INVENTION

In the following detailed description, numerous specific details are set forth in order to provide a thorough understanding of the present invention. There is no intention to limit the invention to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

In general, the invention provides a software application for analysis and processing of food recipes, which allows several one-click features, such as multiplying the quantity of food to be prepared, translating metric measurements to and from US measurements, displaying explanations of gourmet ingredients, detecting nutritional value of a recipe, and retrieving recipes that are tagged for a specific target group (e.g. vegan, Kosher, heart healthy, etc.) Another feature allows retrieval of an ingredient which may be substituted for another, such as a more readily available ingredient. Additionally, the software allows a user to analyze his own recipe (one which is not yet part of the database related to the application), and to compute its nutritional value or multiply the quantity of food to be prepared.

Figure 1A:
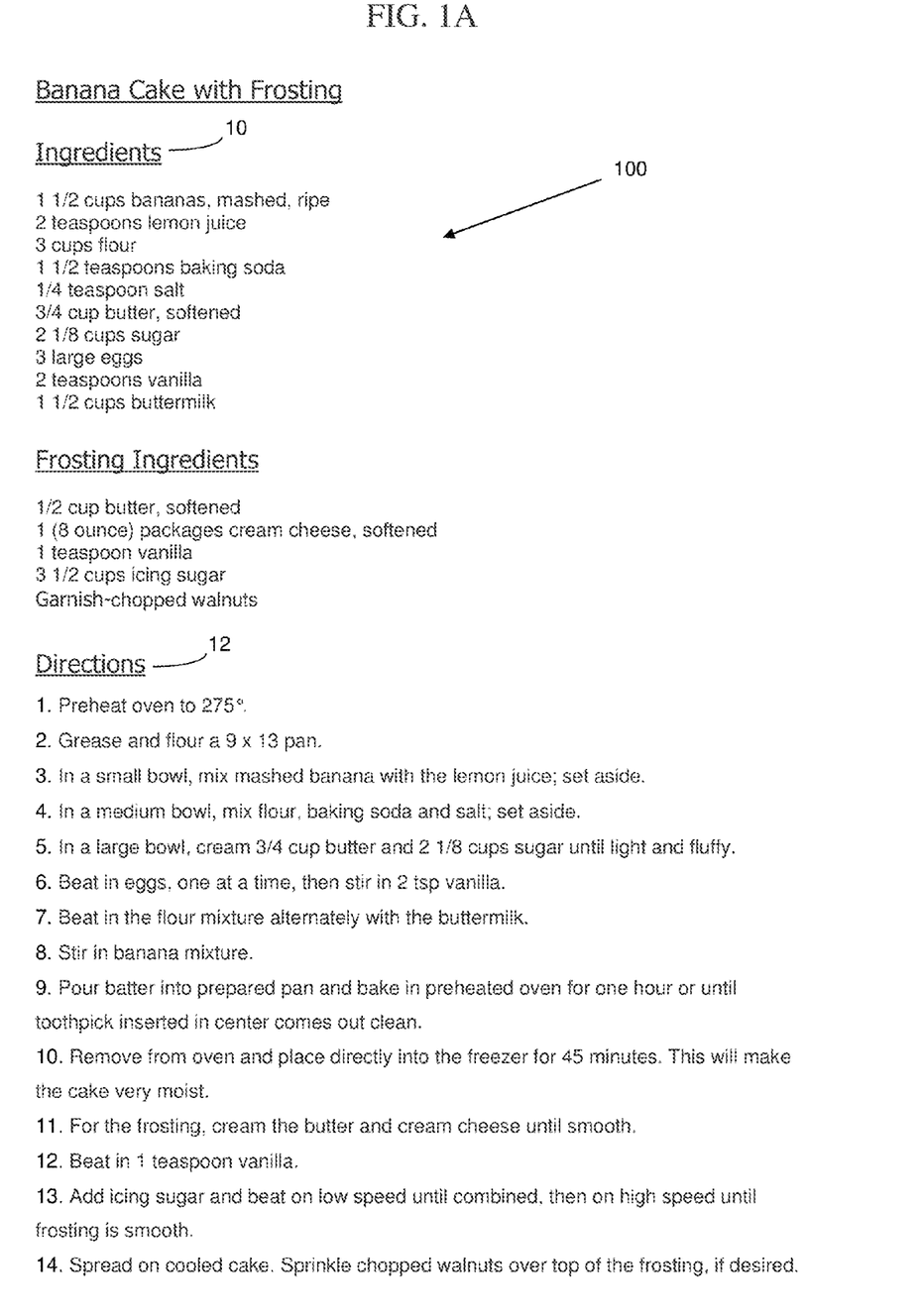
FIG. 1A lists a recipe that a user has selected, for banana cake with frosting.
Figure 1B:
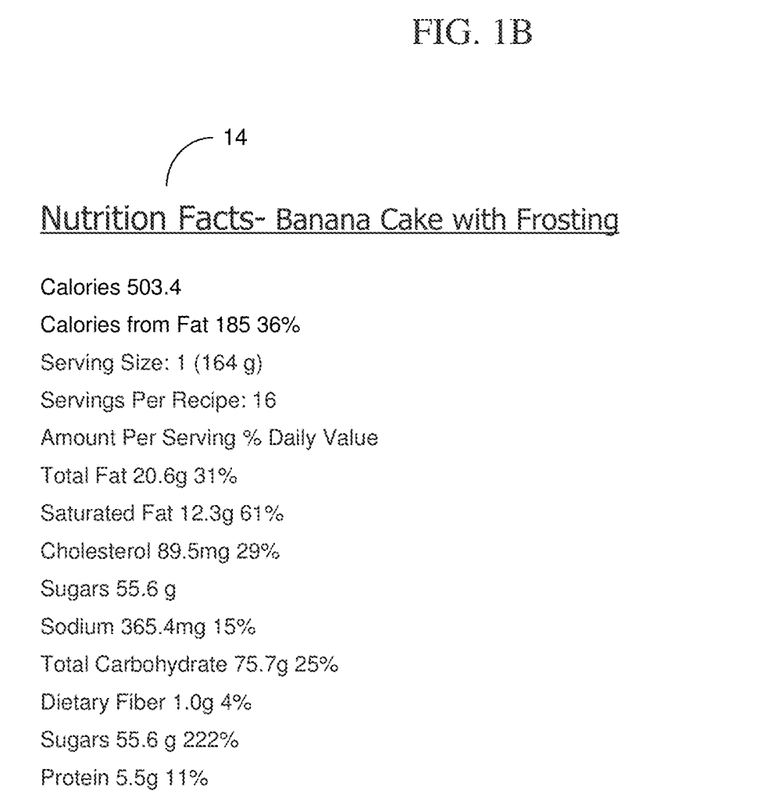
FIG. 1B illustrates the Nutritional Facts for the recipe of FIG. 1A.

Referring now to FIG. 1A, the user has located and downloaded a recipe 100 for Banana Cake with Frosting from the internet, or has typed in or scanned in this recipe himself, and uploaded it to the website running the software of the invention. The recipe 100 typically includes Ingredients 10, Directions 12 of how to prepare the finished food of interest, and may include Nutritional Facts 14 (shown in FIG. 1B.)

Figure 2:
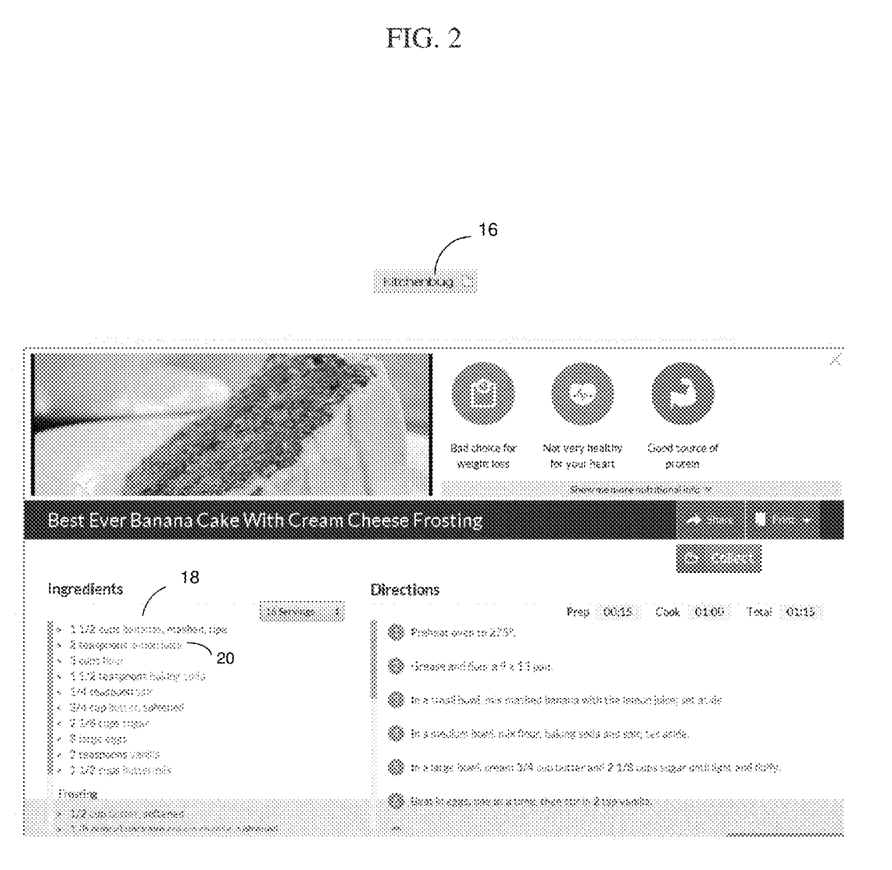
FIG. 2 is a screenshot showing a display of the recipe, after the software of the invention has identified and highlighted the ingredients, to allow retrieval of additional explanations of the ingredients.

Referring to FIG. 2, the user has clicked on the Kitchenbug button 16 which he has previously installed on his toolbar, to run the software of the invention which allows processing of the recipe. After several seconds of processing, the recipe is displayed in the format shown in FIG. 2, in which ingredients have been identified by the software of the invention and are shown highlighted. Clicking on any of the highlighted ingredients, such as bananas 18 or lemon juice 20, will cause a pop-up to appear, including an explanation of the ingredient. This is useful for rare ingredients, such as shown in the recipe for Curry chicken appearing in FIG. 3.

Figure 3:
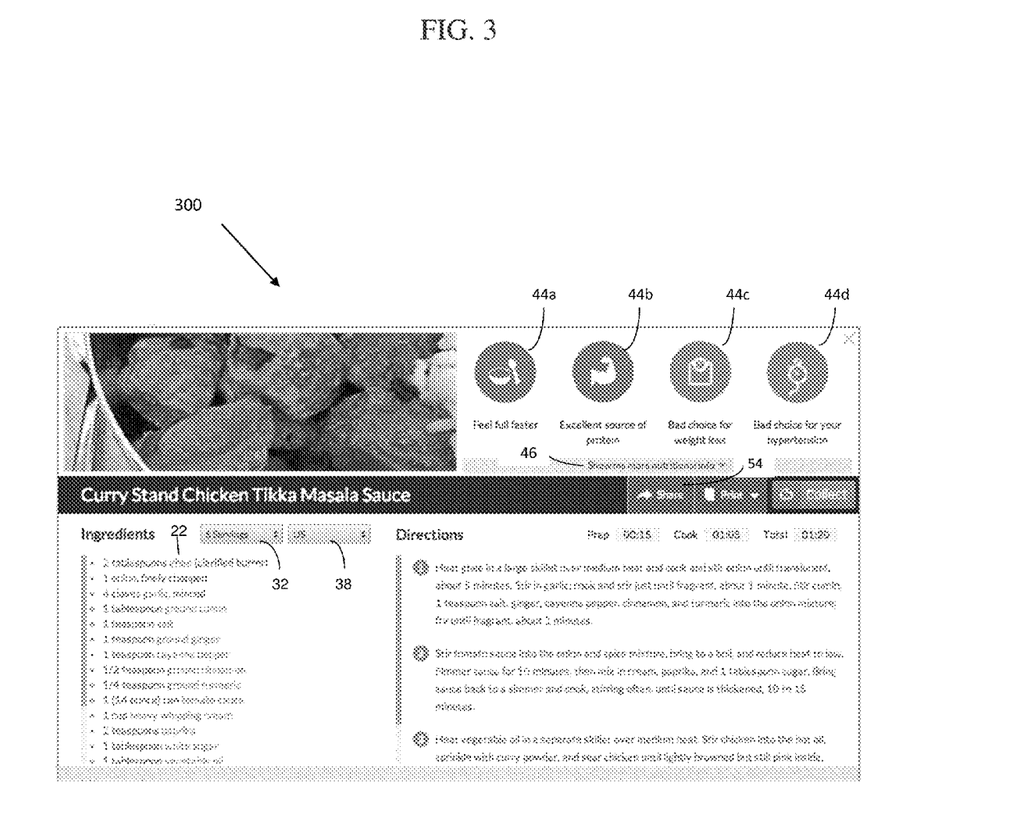
FIG. 3 illustrates a screenshot of a recipe for curried chicken, after processing has occurred by software of the invention, and the rare ingredient "ghee" has been identified and is clickable to display a detailed explanation.

Referring to FIG. 3, a Curried chicken recipe 300 is shown after processing has occurred by software of the invention. The ingredients have been identified and appear highlighted. Clicking for instance, on the first highlighted ingredient, ghee 22, will cause display of an explanation of the ingredient, shown in FIG. 4.

Figure 4:
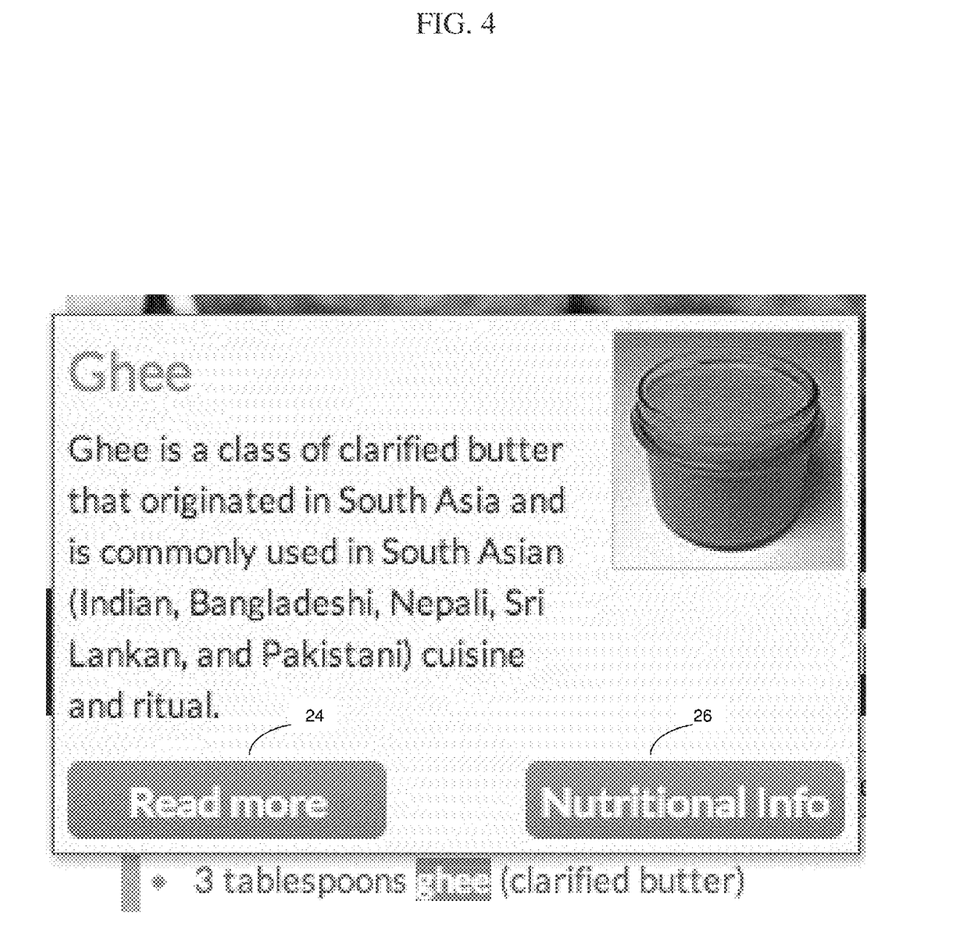
FIG. 4 is a screenshot showing an explanation of the rare ingredient "ghee", and showing a "read more" button to display nutritional information for this ingredient or to display substitute ingredients.

Referring to FIG. 4, when a user has read the explanation of the ingredient Ghee, he may choose to click on Read More 24, which may bring up substitutes for this ingredient, which are either more readily available or are healthier. In this example, the user has clicked on the Nutritional Info button 26 for Ghee, to bring up the information shown in FIG. 5.

Figure 5:
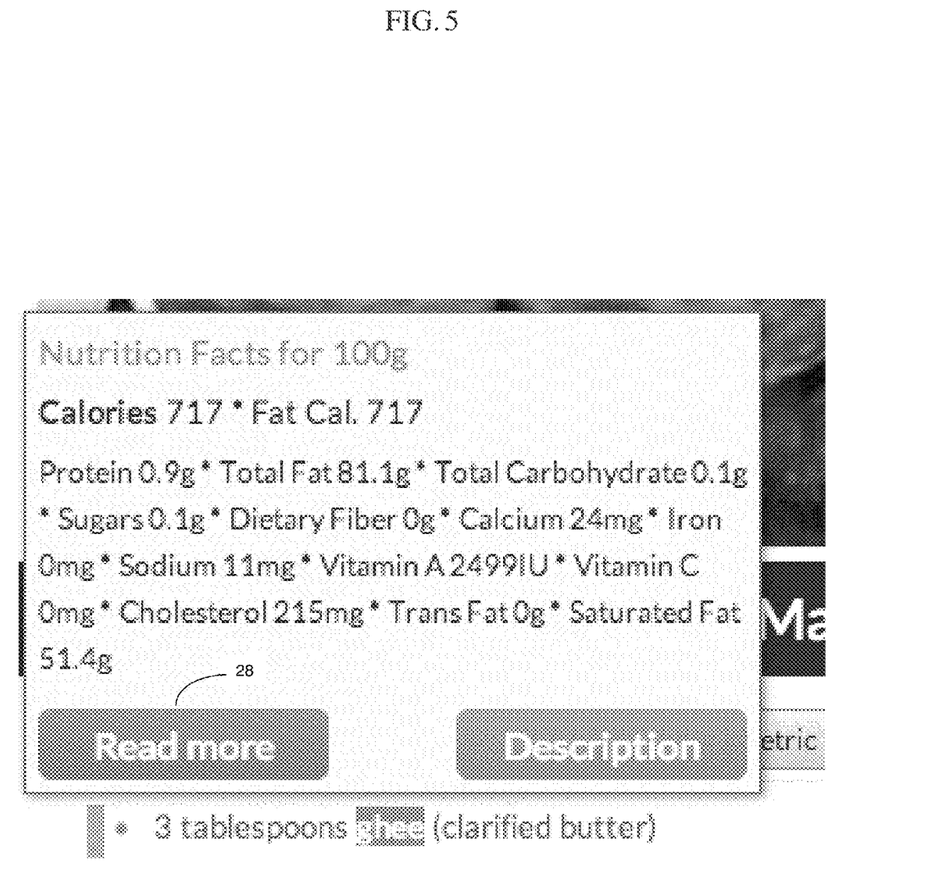
FIG. 5 is a screenshot showing nutritional information for the ingredient ghee.

Referring to FIG. 5, nutritional information for Ghee is shown, and the user may decide whether he wishes to use click on Read More 28, which activates a hyperlink to retrieve a detailed account of the ingredient from the Web. The user may click on Description 30 which will toggle the display back to an explanation of the ingredient.

Figure 6:
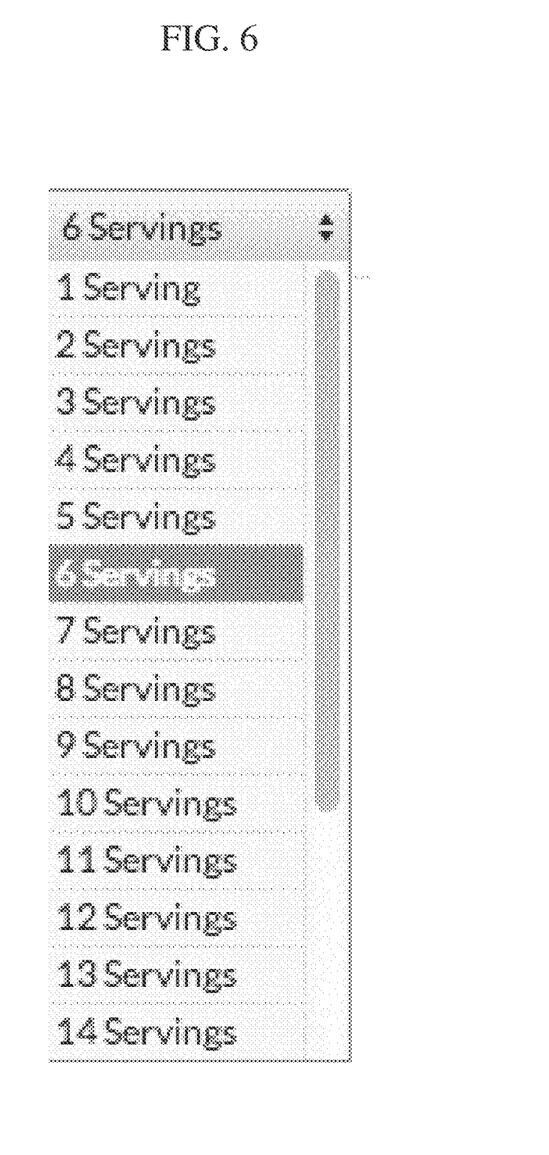
FIG. 6 is a screenshot showing a dropdown menu to allow a user to select the number of servings for the recipe. The number of servings may be easily reduced or multiplied.

Referring back to FIG. 3, after the software of the invention has processed the Curry Chicken recipe 300, and displayed it in the format shown in FIG. 3, the user may click on the button "6 servings" 32 to pull down a menu for changing the number of servings of the recipe, as shown in FIG. 6.

Referring to FIG. 6, the user can select to either enlarge the recipe to suit any number of servings shown in the list, or can reduce the recipe to suit a smaller number of people. As cooks worldwide realize, this button is particularly useful and obviates the need to perform repeated mental calculations to change the quantity of each ingredient. As a recipe typically has many ingredients, often a cook using the prior art method, would forget to double the quantity of one ingredient, which could have disastrous consequences for the final food product.

Figure 7:
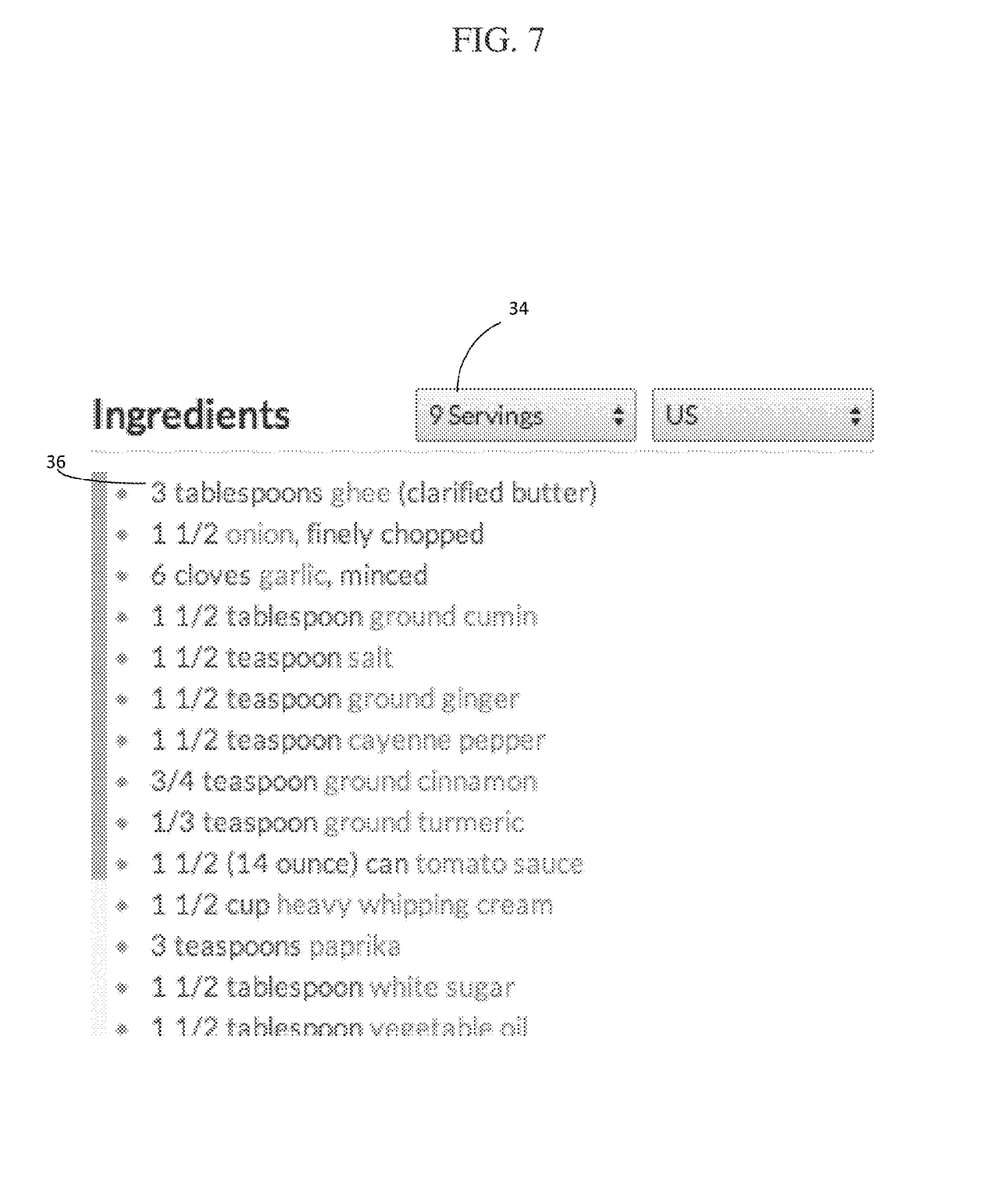
FIG. 7 is a screenshot showing the recipe automatically enlarged to produce nine servings.

Referring to FIG. 7, the user has selected to enlarge the recipe to accommodate 9 servings, as shown in the Servings button 34. The quantity of each ingredient has automatically been adjusted upwards, for example, 3 tablespoons of Ghee 36, instead of 2 tablespoons of Ghee as previously shown in FIG. 3.

Referring back to FIG. 3, a user may click on the US button 38 to convert the measurements in the recipe from US measurements to Metric measurements.

Figure 8:
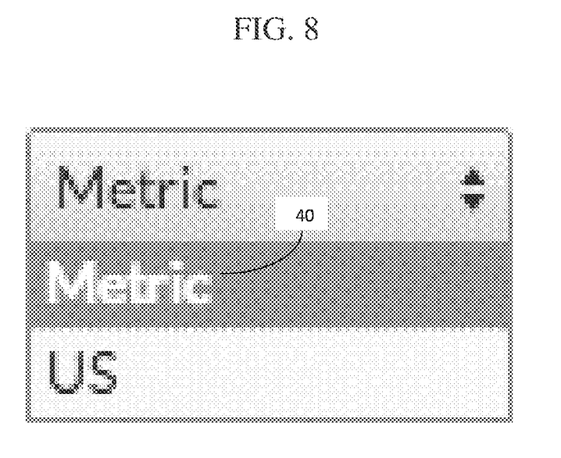
FIG. 8 is a screenshot of a dropdown menu to allow a user to toggle between metric measurements or US measurements.

Referring to FIG. 8, the user has now selected Metric ingredients 40.

Figure 9:
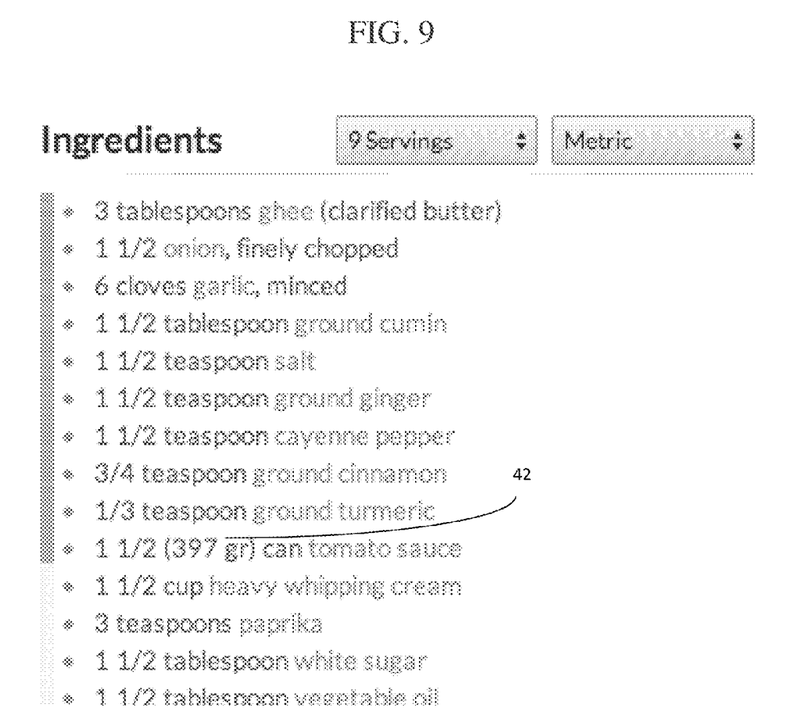
FIG. 9 is a screenshot displaying the ingredients in metric format, instead of the US format shown FIG. 3.

Referring to FIG. 9, the ingredients are now displayed in Metric format. For instance, the recipe now calls for 397 gram of tomato sauce 42, where previously in FIG. 3 this appeared as 14 ounces of tomato sauce.

Referring back to FIG. 3, Nutritional icons 44a, 44b, 44c and 44d at the top right of FIG. 3 are eye-catching and readily understood to the public, as they inform the user "feel full faster", "excellent source of protein", etc. In contrast, prior art nutritional information, (such as that shown in FIG. 1B), is typically hard for the layman to understand. Referring still to FIG. 3, clicking on the "show me more nutritional info" button 46, will bring up the rationale for each of these labels, shown in FIG. 10.

Figure 10:
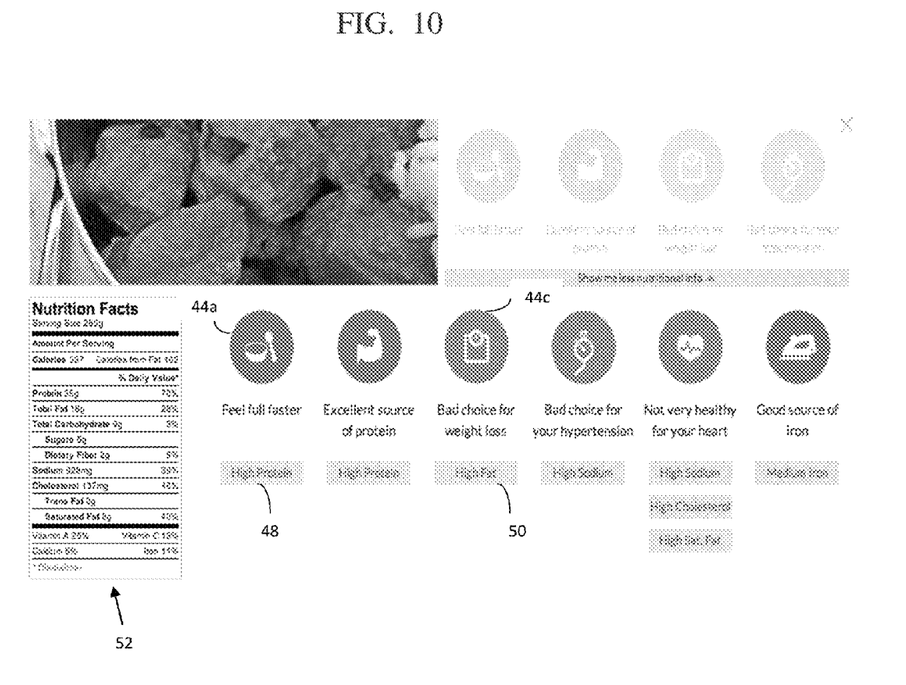
FIG. 10 is a screenshot of nutritional icons.

Referring to FIG. 10, the rationale is shown for each of the Nutritional icons 44a-44d. For instance, under icon 44a "feel full faster", the rational "high protein" label 48 is shown. Under 44c icon "Bad choice for weight loss", the "high fat" label 50 is displayed, which explains the rationale for this icon. Prior art FDA style of Nutrition Facts 52 appears at left.

Referring back to FIG. 3, a user may click on Share button 54, to share the processed recipe via social networks or by sending it via email.

Figure 11:
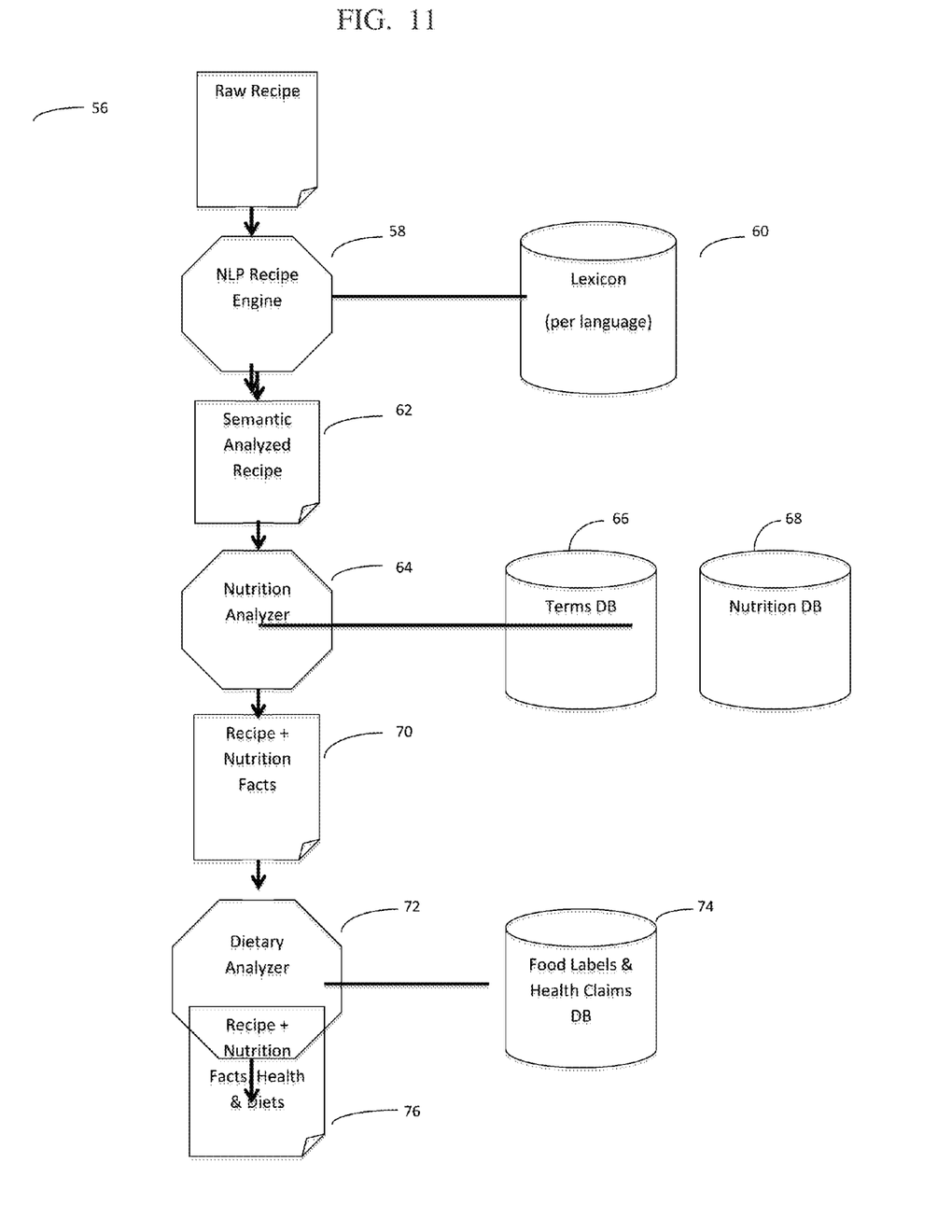
FIG. 11 is a flowchart illustrating the system architecture and processing flow of the software of the invention.

Referring to FIG. 11, a flowchart is shown illustrating the system architecture and processing flow of the software of the invention. In a presently preferred embodiment, a raw recipe 56 is initially input, and the software module termed the NLP Recipe Ermine 58 performs automated analysis of the recipe to convert it from a natural spoken language into a machine readable language. Natural Language Processing (NLP) is a computer field aiming to allow computers to derive the meaning of language, such as from the written context. In the invention, the initial raw recipe is processed so that the ingredients are recognized by the software, and tagged, to provide for instance, definitions of rare ingredients to be shown upon user request, as previously discussed in relation to FIG. 2.

A Lexicon 60 for each language is saved in a separate database (described below), and may be utilized during processing. After processing, a Semantically Analyzed Recipe 62 generated, in which ingredients are identified by the software, and shown for instance in highlight (as in FIG. 2).

The Recipe Analyzer 64 acts to determine the nutritional breakdown of the final food product. Use is made of the Terms Database 66 which provides a list of cooking terminology, defining the fine points of cooking terminology. For instance, "fried" includes oil while "baked" does not, and the effect on the nutritional value of "fresh vegetable" as opposed to that of a "frozen vegetable"). A nutritional database 68 includes nutritional information for possible ingredients.

In Block 70, a recipe including Nutritional icons and blurbs is generated, as shown in relation to FIG. 10.

The Dietary Analyzer 72 includes a Food Labeling Generator which determines the compatibility of each ingredient to certain diets or food ideologies (e.g. vegetarian, Kosher). The topic of food labeling is enlarged upon below. A database of food labels 74 stores a list of such labels.

After several stages of processing, the fully analyzed recipe 76 is outputted in a format that software applications can work with, and displayed to the user as described above in relation to FIGS. 2-10.

Central Software Components:

The software includes a Recipe Analyzer having at its core, a software ermine capable of computing nutritional and dietary information embodied in a given recipe and resulting with a processed and tagged recipe according to predetermined characteristics. Non-limiting examples of "dietary information" are: compatible with diabetes, recommended for children, not recommended for weight loss.

The Recipe Analyzer fetches nutritional information from a database or other external sources. Non limiting examples of databases and external sources, include: FSANZ—NUT-TAB 2010—Food Standards Australia New Zealand, DTU Food—Danish Food Composition Databank, FINELI—Finnish Food Composition Database, AFSSA/CIQUAL French food composition table, The Faculty of Health Sciences, Ben-Gurion University of the Negev—Israeli Food Composition Database, BDA—Food Composition database for Epidemiological Studies in Italy, Sugiyama University—Japanese Food Composition Database, FDA—U.S. Food and Drug Administration—Food Labeling Guide, CFR—Code of Federal Regulations Title 21—Food Labeling-Nutrition Facts Label, NCL (National Consumers League) and U.S. FDA—Food-Drug Interactions, USDA (U.S. Department of Agriculture(—Dietary Guidelines for Americans, Eat Right—Academy of Nutrition and Dietetics, CDC—Centers for Disease Control and Prevention, GPO—U.S. Government Printing Office—Nutrients data, School of Public Health, Harvard—The Nutrition Source.

The Recipe Analyzer further includes a Main Database storing a list of ingredients, compatible nutritional information and labels of ingredients, fetched from said external sources, typical measurement units of ingredients, compatible weight units of ingredients, sub-groups of ingredients, ingredient substitutes, and other related terms thereof. In a presently preferred embodiment, the Main database is independent from the "terms database" and the "Nutritional database".

The Main Database further comprises a list of dietary ideologies and their characteristics; and a list of nutritional disorders and their respective compatible diets. Each ingredient from the main database is tagged as to its relative compatibility with a certain diet. The software engine fetches data from external sources and completes nutritional information within the main database.

The Recipe Analyzer further comprises a Food Labeling Generator capable of tagging a recipe based on its nutritional information as incorporated within the main database. The Food Labeling Generator scans the list of ingredients within a recipe and determines the compatibility of each ingredient to certain diet compliance and/or ideology. The Food Labeling Generator analyzes the obtained information regarding all ingredients in total and results with a labeled recipe. For example, a cucumber will be simultaneously tagged as "low fat", "pregnant safe", "kosher", "vegan" etc.

The analysis process comprises the following stages:

The nutritional and culinary engine analyzes three sections in each recipe:

1. Ingredients. The list of ingredients that composes the recipe. This are the materials used in order to compose the dish.

2. Directions. The list of instructions that are used to cook the recipe. The preparation method is crucial for the analysis since preparation impacts heavily on the nutrition facts of the final dish. For instance, a boiled potato and a fried potato are different in terms of fat content.

3. Yield. How much the recipe produces. This can be measured in the number of servings ("serves 6 people"), in specific units ("20 cookies"), or in mass or volume ("2 liters" or "1 kg") and so on.

Analysis of the recipe is performed in several consecutive stages, each stage utilizing the previous stage's output as input:

1. Linguistic and Semantic

The recipe's natural language is first analyzed semantically using a proprietary NLP-based semantic engine. The purpose of this analysis is to convert the recipe from a "human language" (natural language) to a "digital language" (machine readable language). This process is not trivial in execution, as can be shown in the following examples (and by the Examples pertaining to Item 2 below-Word-net associations and relations):

1 cup olive oil—here, the semantic engine will understand that the ingredient is "olive oil", and that the amount required is "1 cup".

Two dozen cucumbers—here, the semantic engine will understand that the ingredient is "cucumber" and the amount will be translated from the human term "two dozen" into 24, which is something a computer can understand.

The semantic analysis analyzes all of the relevant data in the three sections inside the recipe:

1. Ingredients. Each ingredient is analyzed using a specifically designed semantic engine for ingredients. The engine takes into account different writing styles, and "understands" ingredients written in many different formats. For example "5 garlic cloves", "5 cloves of garlic", "five cloves garlic", "garlic, 5 cloves", etc.

2. Directions. Each instruction step is analyzed grammatically to find the actions a user is required to perform with specific ingredients. For example, "dip the fish in the batter" will indicate that the prepared batter has fish dipped into it. "Fry the onion" will indicate that the onion undergoes a frying process.

3. Yield. The yield section is analyzed to recognize the amount produced by the recipe. The yield is normally composed of a concise row of text, but the software should be able to recognize both simple cases ("6 servings", "2 liters", "20 buns") and complex cases ("2 kg, or enough for 4 500-gr steaks").

Once the first stage of analysis is complete, the Recipe analyzer and its analysis engine has precisely identified the recipe's yield in digital units, the ingredients and their required quantity, and the processes they undergo. The product of this stage is a complete semantic analysis of the recipe.

2. Word-Net Associations and Relations

The second stage of the analysis takes the recipe's semantic analysis (see stage 1) and finds associations for the words and terms that were discovered. The word net is a large data structure of terms, each of which is connected to other terms via different associations and relation types.

For example:

"cherry tomato" and "tomato" are related terms, where the first is a type of the second.

"clove" and "garlic" are related terms, where the first is a natural unit of the second.

"clove" and "spice" are related terms, where the first is a member of the group of the second.

In the second and third bullets, it is evident that a single term will have several associations, each of a different meaning. So the word "cloves" in "3 cloves of garlic" will be tagged with "a natural unit of" with "garlic" as well as "a member of the group" with "spice".

The product of this stage is a complete association map of the recipe.

3. Sterilizing Relations

This stage takes the recipe's association map (see stage 2) and attempts to remove any double meanings by finding the most probable association between terms.

For example:

"3 cloves of garlic"—the word "cloves" is both a natural unit of garlic, and a member of the spices group. The relation sterilizer will see that the ingredient contains the "garlic" term as well, so it will deduce by context that the word "clove" refers to the natural unit rather than the spice. It will remove the unnecessary relation "spice" to avoid duality.

The product of this stage is a sterile association map of the recipe.

4. Indexed Ingredient Discovery

The ingredient indexer goes through the sterile association map (see stage 3) and finds known and indexed ingredients. The engine has a large database of ingredients, each of which contains a lot of information about the ingredient itself.

For example:

"1 cup extra-virgin olive oil"—the indexer goes through the ingredient terms (already discovered on stage 1) and any of its associations and relations, and finds the closest term that is indexed in the database. In this example, "extra-virgin olive oil" relates to "olive oil" (and in turn to "vegetable oil", "oils and fats" etc.). "Olive oil" is found in the database, whereas "extra-virgin olive oil" is not. It will therefore mark the "olive oil" term as the indexed ingredient.

The product of this stage is an indexed association map.

5. Weight Matching and Calculating

After the recipe ingredients have been properly indexed, the proper weight for each ingredient needs to be identified by the software. This will allow the software to calculate larger or smaller portions of the recipe, should the user be interested in cooking for a larger or smaller number of people.

In some cases, ingredients are listed with non-standardized weights, household measurements ("1 cup", "3 tsp"), arbitrary units ("a handful of basil"), inaccurate units ("a few drops of sesame oil") or no units at all ("black pepper").

This stage takes the indexed association map and matches the proper weights to the ingredients according to a weight matching rules engine. The analyzer has a database of known weights for each ingredient, and the weight matching stage matches the proper weight to the unit provided.

For example:

"5 slices of tomato"—the indexed association map indicates that the tomato is an ingredient, and that the unit is "slice"; the weight matcher goes through the list of known weights for tomato, finds the "slice" unit, and attaches it to the ingredient as the proper weight.

After all the weights have been properly matched, each ingredient's amount is calculated according to the gram weight of the unit. So, if a "slice of tomato" weighs 5 grams, and the recipe calls for 5 slices, the calculator indicates that this ingredient actually stands for "25 grams of tomato".

The product of this stage is a fully indexed association map.

6. Creating a Scaling Schema

The recipe's ingredients are ranked according to their gravity of importance in the recipe. The scaling schema generator takes the fully indexed association map (see stage 5) and ranks each ingredient according to its importance.

The importance of an ingredient has to do with the relative weight of the ingredient in the recipe, and the type of ingredient and food group that it belongs. Generally speaking, a meat product will rank higher than a vegetable, a liquid, condiment or spice will rank lower, etc.

This ranking process ultimately creates a scaling schema which is attached to the fully indexed association map. This schema helps the recipe scaling algorithm (the algorithm that can change the number of servings from 4 to 20, for example) to calculate the new amounts of the ingredients. Since scaling is nonlinear, the scaling schema is used to properly calculate the scaling of the recipe.

7. Preparation Impact Analyzer

Once the recipe's ingredients have been properly analyzed and indexed, the prep impact analyzer goes through the fully indexed association map (see stage 5) and finds associations between the ingredients and the directions of the recipe. It then modifies the indexed association map according to each ingredient's prep method.

For example:
"2 onions chopped"—this will be analyzed and indexed to indicate that the ingredient is an onion. However, the direction for this recipe says "fry the onions"; this indicates that the onions undergo a frying process. Frying changes the nutritional value of the ingredient, since oil is introduced during the frying process. The analyzer first associates "frying" to "onion" in the association map, then modifies the indexed ingredient from "onion" to "fried onion".

8. Nutritional Facts Generator

This stage takes the modified association map (see stage 7), goes through its ingredient and fetches the nutritional data for each ingredient, as stored in its database.

It then sums up the nutrition values of each ingredient, and provides the total nutritional data for the recipe.

The product of this stage is a nutritional facts table attached to the modified association map of the recipe, and easy to understand blurbs and icons (e.g. "heart healthy").

9. Food Labeling

The food labeling generator takes the nutritional facts table (see stage 8) and generates a long list of respective food labels. Some food labels are:

Nutrition labels—low fat, high sodium, sugar free etc.
Diet compliance—Atkins, DASH, Scarsdale
Clinical information—non-diabetic, pregnant safe, lactose free
Religious and ideological—Kosher, Halal, vegan In one embodiment of the invention, the Recipe Analyzer can modify recipes automatically to accommodate specific user preferences.

In some embodiments, the software can generate and display a shopping list based on the recipe and its identified ingredients.

In some embodiments, the software can display a list of alternative ingredients which can be substituted for a specific ingredient upon user request. This is useful when an ingredient is not available or has healthier alternatives.

In some embodiments, analyzed recipes may be saved to a folder, or popular recipes may be displayed on a dedicated website.

In one embodiment of the invention, the Recipe Analyzer can comprehend user preferences and can suggest other recipes he might be interested in. This is accomplished by accumulating historical data of the user's recipe search and the user's recipe selection.

The software of the invention may be provided as an application which may be run upon a user electronic device selected from: a cellular phone, a tablet, a personal computer, and a personal digital assistant. The software of the invention is operable from any suitable electronic device, computer, computer system or related group of computer systems known in the art. In one embodiment, the software is installed upon a server or server computer system which is connected by at least one input/output port to a communication network. The communication network may be a local area network connecting a plurality of computers via any suitable networking protocol, including but not limited to Ethernet. In another embodiment, the communication network is the Internet and the system comprises server software capable of communicating with client computers via the Internet via any suitable protocol, including but not limited to HTTPS.

In such case, the invention may be provided to a user as software as a service (SaaS) which will obviate a user from hardware needs such as a server and necessary server maintenance, security, etc. In one embodiment, a user may use a browser such as Internet Explorer™, Mozilla Firefox, Chrome or Safari, to browse on the server via the internet. Any processing device may be utilized, including for instance, a personal computer, a laptop, a PDA or a cellular phone.

Suitable processors for implementation of the invention include, by way of example, both general and special purpose microprocessors. Generally, a processor will receive instructions and data from a read-only memory and/or a random access memory.

Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EPROM, and flash memory devices; magnetic disks such as internal hard disks and removable disks; magneto-optical disks; and CD-ROM disks.

The invention is embodied in any suitable programming language or combination of programming languages, including Google Web Toolkit, JAVA, database managers and MySQL.

Each software component can be implemented in a high-level procedural or object-oriented programming language, or in assembly or machine language if desired. The programming language may be a compiled or interpreted language.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A computerized method for processing and analyzing a food recipe and for providing a nutritionally analyzed recipe indicating the nutritional value of said recipe, said method comprising:
   a) receiving a user indication of a food recipe of interest, in digital format or receiving a recipe from a user;
   b) utilizing a natural language processing module, to identify ingredients listed in said food recipe;
   c) automatically generating a semantically analyzed recipe, by retrieving data on said identified ingredients from a database of ingredients and information related to said ingredients;
   d) visually indicating upon a display, the availability of said retrieved information related to said ingredient, wherein user selection causes display of said information;
   e) using a recipe analyzer module, and a food labeling generator, to automatically determine the nutritional breakdown of said recipe, and displaying upon a user display, at least one graphic object indicating a dietary label and nutritional value of the food which the recipe produces, wherein selection of the graphic object causes display of an explanation of said dietary label;
   f) providing to the user one or more of the following:
      functionality to alter the measurements of ingredients according to the number of servings the user indicates; and;
      functionality to toggle between metric and US measurements indicated for the ingredients;
      provide a user with said resultant food recipe of steps a)-e), as a final processed food recipe displayable upon a user display.

2. The method of claim 1, wherein said receipt of a user indication of a food recipe is selected from the following: receipt of a recipe uploaded by a user; receipt of a recipe obtained by a user from an external website; and selection of a recipe by a user from a database of recipes maintained on a dedicated website.

3. The method of claim 1, wherein said visually indicating upon a display, the availability of said retrieved information related to an ingredient comprises displaying upon said recipe, one or more of the following: highlighting the name of said ingredient; and providing a graphic symbol adjacent to said ingredient.

4. The method of claim 1, wherein said functionality to alter the measurements of said ingredients; and said functionality to toggle between metric and US measurements, comprise automatically performing calculations to multiply or divide said measurements according to user indication.

5. The method of claim 1, wherein said dietary labels for food produced by a recipe are selected from one or more of the following group: kosher; vegan; halal; heart healthy; allergen free; compliant with a predefined well-known diet; sugar free; high in protein; bad/good for weight loss; bad/good for weight loss; good source of a predefined mineral; good source of a predefined vitamin; and high/low in sodium.

6. The method of claim 1, wherein said retrieved data related to said identified ingredients comprises one or more of the following: an explanation of the identity of an ingredient; an explanation how to prepare an ingredient; and substitutes for said ingredient.

7. The method of claim 1, further comprising providing a user with nutritional data related to said food recipe or related to an ingredient listed in said recipe.

8. The method of claim 1, further providing a user with the ability to electronically forward said processed recipe to another user.

9. The method of claim 1, further providing a user with the ability to save said processed recipe in a digital recipe collection.

10. The method of claim 1, wherein the user indication of a food recipe is received from the user through a network comprised of the internet or a local area network.

11. The method of claim 1, wherein said user indication of a recipe of interest, is received from a user electronic device selected from: a mobile phone, a personal computer, a tablet, and a personal digital assistant.

12. A system for processing and analyzing of a food and for providing a nutritionally analyzed recipe indicating the nutritional value of said recipe, comprising:
   a processor interacting with associated peripherals, said processor including a memory device and a driver; display means; said processor being in communication with said memory device, and being configured to:
   a) receive a user indication of a food recipe of interest, in digital format;
   b) utilizing a natural language processing module, to identify ingredients listed in said food recipe;
   c) automatically generating a semantically analyzed recipe, by retrieving data on said identified ingredients from a database of ingredients and information related to said ingredients;
   d) provide a user with a visual indication upon a user display, the availability of said retrieved information related to said ingredient, wherein user selection causes display of said information;
   e) using a recipe analyzer module, and a food labeling generator, to automatically determine the nutritional breakdown of said recipe, and displaying upon a user display, at least one graphic object indicating a dietary label for the food which the recipe produces, wherein selection of the graphic object causes display of an explanation of said dietary label;
   f) provide the user one or more of the following:
      functionality to alter the measurements of ingredients according to the number of servings the user indicates;
      functionality to toggle between metric and US measurements indicated for the ingredients;
      provide a user with said resultant food recipe of steps a)-e), as a final processed food recipe displayable upon a user display.

13. The system of claim 12, wherein in said step c), said database of ingredients and information related to said ingredients is stored on computer-readable storage medium upon a server.

14. The system of claim 12, wherein said step of identify ingredients comprises the following steps: producing an indexed association map of said ingredients, identifying measurements associated with said ingredients; and ranking said ingredients according to their gravity of importance in the recipe.

15. The system of claim 12, wherein said in step e), said displaying at least one graphic object indicating a dietary label, is performed using a recipe analyzer module and a dietary analyzer module, to determine nutritional breakdown of said food produced by said recipe.

16. The system of claim 12, wherein said system utilizes a server in communication with a remote electronic device of a user, wherein said server is configured to perform steps a)-f) and to receive a user indication of a food recipe of interest, and to provide said final processed food recipe to said remote electronic device of said user, for display upon display means associated with said remote electronic device; and wherein said remote electronic device may be utilized to communicate with said server.

17. The system of claim 12, wherein said remote electronic device is selected from: a mobile phone, a personal computer, a tablet, and a personal digital assistant.

* * * * *